(12) United States Patent
Kelly

(10) Patent No.: US 11,946,505 B2
(45) Date of Patent: Apr. 2, 2024

(54) SURFACE PANEL CONNECTION SYSTEM

(71) Applicant: FASTMOUNT LIMITED, North Shore City (NZ)

(72) Inventor: Gregory John Kelly, Auckland (NZ)

(73) Assignee: Fastmount Limited, Aucklund (NZ)

( * ) Notice: Subject to any disclaimer, the term of this patent is extended or adjusted under 35 U.S.C. 154(b) by 455 days.

(21) Appl. No.: 17/216,873

(22) Filed: Mar. 30, 2021

(65) Prior Publication Data

US 2021/0215179 A1    Jul. 15, 2021

Related U.S. Application Data

(63) Continuation of application No. 16/644,119, filed as application No. PCT/NZ2019/050012 on Feb. 8, 2019, now Pat. No. 10,982,698.

(30) Foreign Application Priority Data

Feb. 8, 2018  (NZ) ........................................ 739745
Nov. 5, 2018  (AU) ............................... 20180904195

(51) Int. Cl.
*F16B 5/06*      (2006.01)
*E04F 13/08*     (2006.01)
(Continued)

(52) U.S. Cl.
CPC ........ *F16B 5/0685* (2013.01); *E04F 13/0839* (2013.01); *E04F 13/0841* (2013.01);
(Continued)

(58) Field of Classification Search
CPC ........ F16B 21/07; F16B 21/06; F16B 21/073; F16B 21/075; F16B 21/076; F16B 21/078;
(Continued)

(56) References Cited

U.S. PATENT DOCUMENTS 1,548,586 A    8/1925  Edkins
1,723,621 A *  8/1929  Jewell ................. E04F 13/0839
                                              52/630

(Continued)

FOREIGN PATENT DOCUMENTS

CN    203977786 U    12/2014
DE    10153858 A1 *  5/2003   ............... E04B 9/04

(Continued)

OTHER PUBLICATIONS

Chris Hang (Authorized Officer), International Search Report dated Apr. 11, 2019, PCT Application No. PCT/NZ2019/050012, pp. 1-4.

(Continued)

*Primary Examiner* — Jonathan P Masinick

(57) ABSTRACT

Embodiments of the present invention provide a connection system with a projection on a first connector and a co-operating cavity on a second connector to provide push-through connection of the connectors in first and second configurations in which the projection extends to first and second depths respectively within the cavity, wherein one or more of the projection or cavity is movable in two dimensions perpendicular to a longitudinal axis of the projection when received in the cavity, wherein the first and second connectors have cooperating locking surfaces arranged to engage each other when the projection is received at the second depth to prevent said movement in two dimensions and wherein the cooperating locking surfaces do not engage each other so as to prevent said movement in two dimensions when the projection is received at the first depth in the receiving cavity.

8 Claims, 8 Drawing Sheets

(51) Int. Cl.
*E04F 13/24* (2006.01)
*F16B 17/00* (2006.01)

(52) U.S. Cl.
CPC .......... *E04F 13/0862* (2013.01); *E04F 13/24* (2013.01); *F16B 17/008* (2013.01); *E04F 13/0858* (2013.01)

(58) Field of Classification Search
CPC ........ F16B 21/12; F16B 21/125; F16B 21/20; F16B 5/06; F16B 5/0685; F16B 5/12; E04F 13/08; E04F 13/0801; E04F 13/0835; E04F 13/24; E04F 13/25; E04F 13/0839; E04F 13/0841; E04F 13/0862; E04F 13/0857; E04F 13/086
See application file for complete search history.

(56) References Cited

U.S. PATENT DOCUMENTS

| | | | | |
|---|---|---|---|---|
| 1,854,772 | A * | 4/1932 | Stuken | E04F 13/0816 52/773 |
| 2,395,726 | A * | 2/1946 | Del Tufo | E04F 13/0839 52/509 |
| 2,946,612 | A | 7/1960 | Ahlgren | |
| 3,182,367 | A | 5/1965 | Hamann | |
| 3,393,599 | A | 7/1968 | Fisher | |
| 4,050,120 | A | 9/1977 | Yamaguchi | |
| 4,253,226 | A * | 3/1981 | Takeda | A44B 17/0035 264/249 |
| 5,291,639 | A | 3/1994 | Baum | |
| 5,332,347 | A | 7/1994 | Kimisawa | |
| 5,894,641 | A | 4/1999 | Hurtz | |
| 6,761,411 | B2 | 7/2004 | Boehmer | |
| 7,082,919 | B2 | 8/2006 | Nonogaki | |
| 7,320,571 | B2 | 1/2008 | Kanie | |
| 7,891,151 | B2 | 2/2011 | Sano | |
| 8,328,488 | B2 | 12/2012 | Luk | |
| 8,341,804 | B2 | 1/2013 | Yoshii | |
| 8,677,573 | B2 * | 3/2014 | Lee | F16B 21/076 24/297 |
| 8,689,409 | B2 | 4/2014 | Hanley | |
| 9,228,602 | B2 | 1/2016 | Kelly | |
| 9,523,382 | B2 | 12/2016 | Blancke | |
| 9,538,815 | B2 | 1/2017 | Lu | |
| 9,644,667 | B2 * | 5/2017 | Farahani | G06F 1/1633 |
| 9,816,460 | B2 | 11/2017 | Kondo | |
| 10,001,156 | B2 | 6/2018 | McClure | |
| 2005/0008456 | A1 | 1/2005 | Birkelbach | |
| 2008/0044255 | A1 | 2/2008 | Rosemann | |
| 2009/0026673 | A1 | 1/2009 | Clark | |
| 2012/0168246 | A1 | 7/2012 | Kondo | |
| 2012/0189382 | A1 | 7/2012 | Health | |
| 2014/0314517 | A1 | 10/2014 | Kelly et al. | |
| 2018/0023604 | A1 * | 1/2018 | Stastny | F16B 5/025 403/376 |
| 2018/0023759 | A1 * | 1/2018 | Stender | F16M 11/22 248/71 |
| 2018/0252252 | A1 | 9/2018 | Fritzsch | |

FOREIGN PATENT DOCUMENTS

| | | | | |
|---|---|---|---|---|
| DE | 102018200021 | A1 | 7/2019 | |
| FR | 2832746 | A1 * | 5/2003 | ............ E04B 2/967 |
| FR | 2839124 | A3 | 10/2003 | |
| GB | 1529073 | A | 10/1978 | |
| GB | 2472654 | A | 2/2011 | |
| KR | 20150056742 | A * | 5/2015 | |
| KR | 20150081517 | A * | 7/2015 | |
| NL | 1005401 | C2 * | 8/1998 | .......... E04F 13/0862 |
| WO | 2013126851 | A1 | 8/2013 | |

OTHER PUBLICATIONS

Chris Hang, Examination Report dated Sep. 16, 2020, AU Application No. 2019217218, pp. 1-5.
Extended European Search Report dated Oct. 13, 2021, EP Application No. 19751977, 7 pages.
Chinese Office Action dated Nov. 21, 2021, CN Application No. 201980016511.3, 8 pages.

* cited by examiner

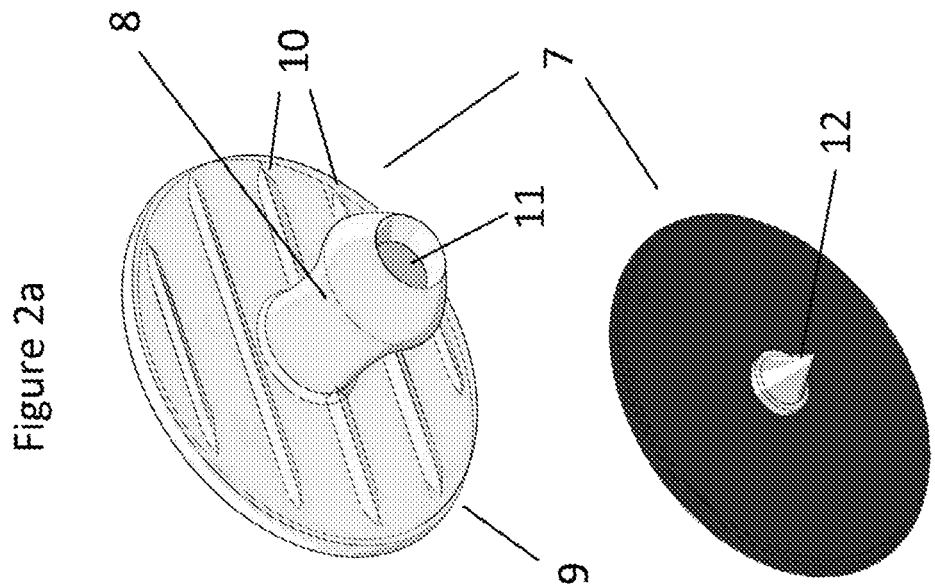
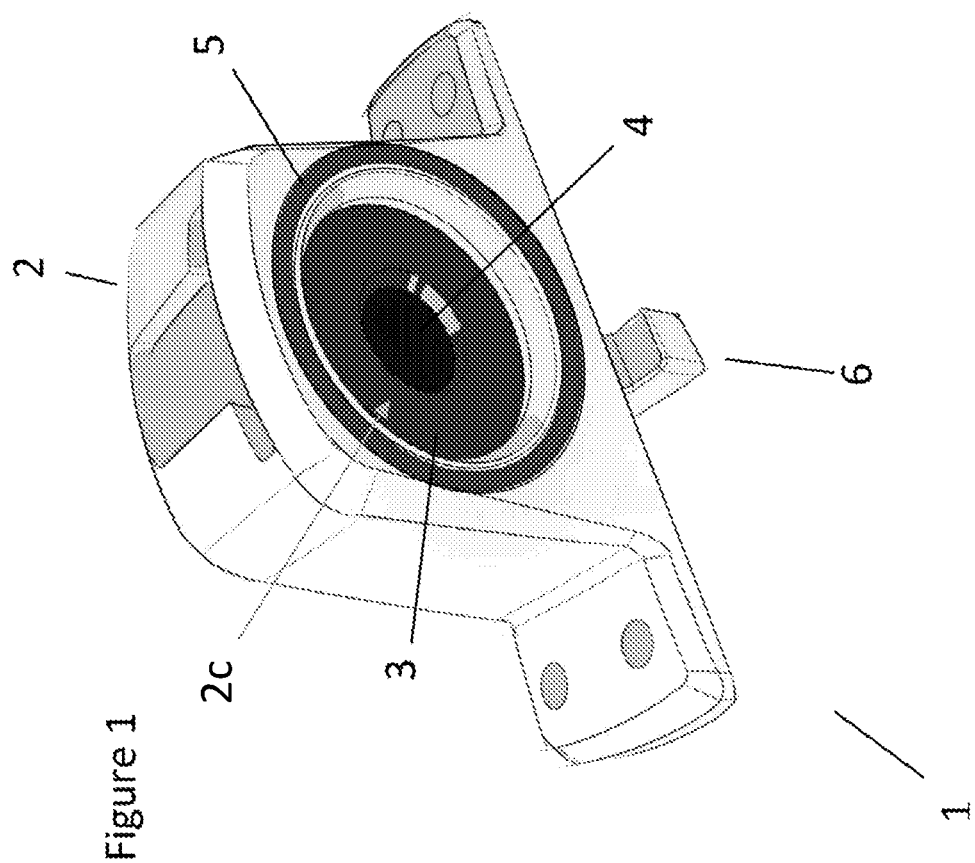

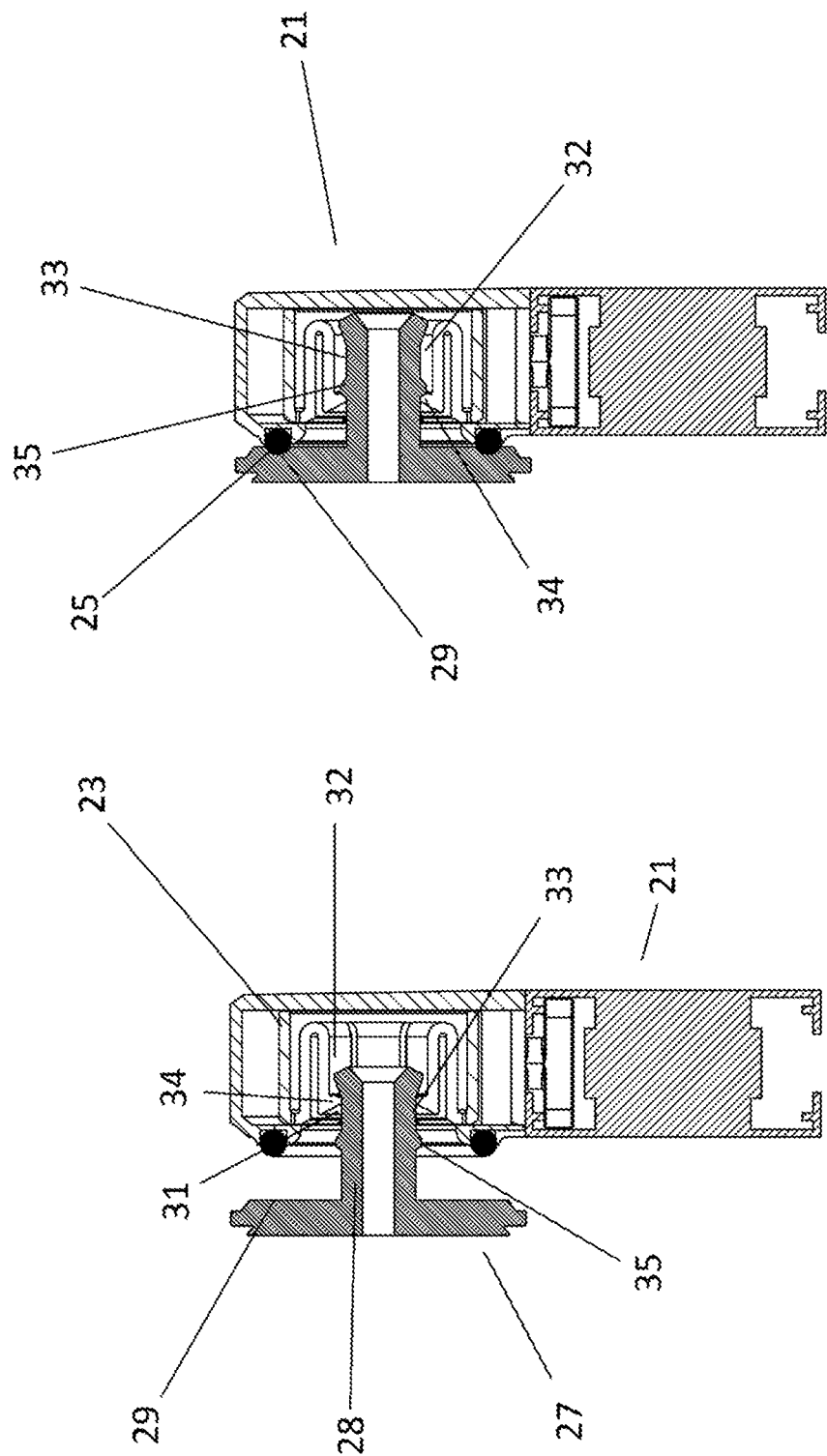

SURFACE PANEL CONNECTION SYSTEM

CROSS REFERENCE TO RELATED APPLICATIONS

This application is a Continuation of U.S. application Ser. No. 16/644,119, filed Mar. 3, 2020, which is a U.S. National Stage entry of PCT/NZ2019/050012, filed Feb. 8, 2018, which claims priority to NZ Application No. 739745, filed Feb. 8, 2018; and AU Application No. 2018904195, filed Nov. 5, 2018, the contents of all of which are hereby incorporated by reference in their entirety.

TECHNICAL FIELD

This invention relates to a surface panel connection system such as can be used to secure a surface panel to an underlying support such as a support framework this framework preferably being used to form a portion of a wall, ceiling or roof of a structure.

BACKGROUND ART

Buildings can be constructed using a range of panel-based products.

These panels can be used to define the exterior walls or roof of a structure or can provide the interior surfaces of a structure's ceilings or internal walls.

These types of panels predominantly require a skilled installer to mount and secure panels in place. For example, gypsum boards or drywall sheets are commonly used in the construction of interior walls and ceiling surfaces. These types of panels need to be cut to an appropriate size, nailed or otherwise fixed in place against a supporting framework, and then have filler material applied between adjacent panel joints. The installer then needs to wait for the filler material to set before they can sand it smooth enough for a decorative finish to be applied.

As can be appreciated by those skilled in the art the installation of existing building material panels is a time-consuming and specialised task.

It would therefore be of advantage to have an improved surface panel connection system, apparatus or components of same which addressed any or all the above issues, or at least that provided an alternative choice to the prior art. In particular it would be of advantage to have a connection system which allowed a relatively unskilled installer to engage a surface panel with a support framework quickly and using a limited number of tools. It would also be of advantage to have improvements over the prior art which provided some flexibility in the positioning of a panel once initially engaged with a support frame, and which also allowed panels to be readily detached from the support frame if desired.

DISCLOSURE OF INVENTION

According to one aspect of the present invention there is provided a connection system operable to secure a surface panel of a structure to a support, the system including a male connector and a female connector, each of which is to be engaged with either of a panel or support respectively, the male connector defining an engagement projection extending from an engagement surface of the male connector, and the female connector defining a receiving cavity with a form complementary to the engagement projection, the receiving cavity being movable in two dimensions substantially perpendicular to an axis of the received engagement projection said movement being relative to a an engagement surface of the female connector;

the engagement projection and complementary receiving cavity being operable to secure a portion of the engagement projection in a positioning zone of the receiving cavity and alternatively in a locking zone of the receiving cavity, wherein when the portion of the engagement projection is secured in the positioning zone the male connector is secured to the female connector but movable with the receiving cavity to allow movement of the male connector relative engagement surface of the female connector in said two dimensions, and wherein when the portion of the engagement projection is secured in the locking zone the engagement surfaces of the male and female part engage with each other to prevent said movement in two dimensions to lock the male connector in position.

According to a further aspect of the present invention there is provided a connection system as described above wherein the female connector comprises a main body which is able to be fixed relative to the support or panel engaged with the female connector and wherein the engagement surface is provided on the main body to lock the male connector relative to the support or panel.

According to a further aspect of the present invention there is provided a connection system as described above wherein the engagement projection and complementary receiving cavity are operable to allow the portion of the engagement projection to move from the positioning zone to the locking zone by the male connector being forced relatively towards the female part to force said portion of the male connector past the positioning zone. The engagement projection and complementary receiving cavity may be operable to allow said portion of the engagement projection to be pushed beyond the positioning zone to secure said portion in the locking zone.

According to a further aspect of the present invention there is provided a connection system as described above wherein at least one of the engagement surfaces includes a flexible, resilient gripping surface configured to engage with the other engagement surface.

According to a further aspect of the present invention there is provided a connection system as described above wherein an engagement surface at least partially surrounds the entrance to the receiving cavity.

According to a further aspect of the present invention there is provided a connection system as described above wherein the female connector includes a housing configured to engage the support or panel and includes a receiving element located in the housing cavity to define the receiving cavity for the projection of the male connector wherein the receiving element is movable within the housing in two dimensions perpendicular to a longitudinal axis of the receiving cavity to allow a male connector of a projection received in the receiving cavity to be positioned in said two dimensions relative to the female connector, and wherein the receiving element is retained in the housing cavity to movably secure the male connector to the female connector.

According to a further aspect of the present invention there is provided a connection system wherein the housing defines a housing entrance which exposes the receiving cavity over an area which the receiving cavity is movable.

According to a further aspect of the present invention there is provided a connection system wherein the receiving element has one or more dimensions perpendicular to the longitudinal axis of a projection when received and the housing cavity has dimensions perpendicular to the longitudinal axis of a projection when received and wherein said dimensions of the receiving element are smaller that said dimensions of the housing cavity to allow movement of the receiving element perpendicular to said axis of the projection. The movement may be in two dimensions.

According to a further aspect of the present invention there is provided a connection system as described above including a beam operable to be assembled with other beams to provide the support as a framework wherein the beam may include one or more features operable to locate, position and/or engage with either a male or female connector. A feature may be a channel. A feature may be a rail.

According to a further aspect of the present invention there is provided a connection system as described above wherein a friction lock assembly may extend from a surface of the male or female connector which is to face the channel formed in a beam of the support framework.

According to a further aspect of the present invention there is provided a connection system as described above wherein the friction lock assembly may project into the channel, with the orientation of the assembly relative to the channel determining whether the connector is free to move along the channel or is locked in place at a specific point on the channel.

In some embodiments where a friction lock assembly is provided with the connector, this assembly may be detachable from the main body of the connector. For example in some instances the friction lock assembly may be engaged with the main body of the connector with the use of one or more screws, allowing different assemblies to be attached and detached depending on the form or dimensions of the channel being used.

According to a further aspect of the present invention there is provided a connection system as described above wherein the channel is located at a side of the beam perpendicular to an engaged panel in use.

According to one aspect of the present invention there is provided a female connector of a connection system operable to secure a surface panel of a structure to a support, the female connector operable to be engaged with either of a panel to be engaged with a support or to the support, the female connector defining a receiving cavity for an engagement projection of a male connector, the receiving cavity being movable perpendicular to an axis in which the projection is received and relative to the panel or support engaged by the female connector, the female connector having an engagement surface arranged perpendicular to a longitudinal axis of the projection when received to be engaged by an engagement surface of a male connector to lock the receiving cavity against said movement relative to the panel or support.

According to one aspect of the present invention there is a male connector of a connection system operable to secure a surface panel of a structure to a support, the male connector operable to be engaged with either of a panel to be engaged with a support or to the support, the male connector defining an engagement projection extending from a locking surface, the locking surface including either of one or more projections operable to engage a resilient gripping surface or a resilient gripping surface operable to be engaged by one or more projections. According to one aspect of the present invention there is provided a connection system used to engage a surface panel of a structure with a support framework, the system including a male connector and a female connector, each of which is to be engaged with either of a panel or support framework respectively, the male connector defining an engagement projection extending from a locking surface, and the female connector defining a receiving cavity with a complimentary form to the engagement projection, the interior walls of the receiving cavity defining a first positioning zone arranged to secure a portion of the engagement projection while holding the locking surface out of contact with the female connector, and a second locking zone arranged to secure the same portion of the engagement projection while engaging the locking surface with the female connector.

According to a further aspect of the present invention there is provided a connection system as described above wherein the female connector includes at least one flexible resilient gripping surface which at least partially surrounds the entrance to the receiving cavity and which is configured to engage with the locking surface of the male connector.

According to yet another aspect of the present invention there is provided a connection system as described above wherein said gripping surface deforms around at least one protrusion formed in the locking surface when in contact with the locking surface to impede movement of the male connector in a direction substantially perpendicular to the longitudinal axis of the engagement projection.

According to a further aspect of the present invention there is provided a panel mounting assembly which includes a set of beams operable to be assembled into a support framework, and a plurality of connection systems formed by male connectors and female connectors substantially as described.

According to yet another aspect of the present invention there is provided a female connector for a connection system, the female connector defining a receiving cavity with a complimentary form to an engagement projection of a male connector, the interior walls of the receiving cavity defining a first positioning zone arranged to secure a portion of the engagement projection while holding a locking surface of the male connector out of contact with the female connector, and a second locking zone arranged to secure the same portion of the engagement projection while engaging the locking surface with the female connector.

In one aspect the present invention is arranged to provide a connection system used to engage a surface panel with a support framework. In a further aspect the invention may provide a complete panel mounting assembly consisting of a plurality of such connection systems provided in combination with a support framework. In yet a further aspect the invention provides a female connector in isolation for such a connection system.

Reference in general throughout this specification will be made to the invention being provided by a connection system composed of a plurality of male and female connectors as discussed in further detail below. However those skilled in the art will appreciate that these references should in no way be seen as limiting to the scope of the invention.

The invention allows surface panels to be engaged with a support framework in the assembly of a structure. These surface panels can be used for various parts of a number of different types of structures, to define—for example—exterior wall surfaces, roof surfaces, interior wall surfaces and/or ceiling surfaces.

Reference in general throughout this specification will however be made to the invention assisting in the assembly of interior wall and ceiling surfaces. Those skilled in the art will appreciate that the invention may perform other roles if required in other embodiments.

The invention can engage with a number of different forms of surface panels. These panels may in general be formed by substantially flat sheets of material, preferably with a regular or modular character. Once connected to a support framework one side of the panel will be visible to an observer and can potentially include various decorative treatments. With these arrangements the visible side of the panel can be defined as the exterior side, and the opposite side of the panel as the interior side.

Those skilled in the art will also appreciate that a number of different approaches may be used to attach a connector to the interior side of a surface panel. For example in some embodiments an adhesive may applied between the components. In other embodiments an intermediate mechanical connector, such as for example a screw or nail may penetrate both the connector and panel to engage both these components together.

The panel mounting assembly provided by the invention engages with a support framework to locate a panel within a structure being assembled. This support framework may be formed from an array of connected beams capable of securing panels in desired positions. These beams may be formed from various materials in a number of embodiments and may preferably include one or more channels used to locate, position and/or engage with either a male or female connector.

For example in some embodiments a support framework may be provided by an array of extruded aluminium beams orientated at right angles to one another to define a grid-based framework. Preferably these extruded beams may define one or more channels which run at least a portion of the length of a beam, where each channel can assist in locating a connector at a particular point along the length of the beam.

In a preferred embodiment a friction lock assembly may extend from a surface of the connector which is to face the channel formed in a beam of the support framework. This friction lock assembly may project into the channel, with the orientation of the assembly relative to the channel determining whether the connector is free to move along the channel or is locked in place at a specific point on the channel.

For example in a further preferred embodiments a friction lock assembly may be provided through a 'T' shaped projection extending from one surface of the connector. When the crossbar of the 'T' is inserted parallel to the channel this will allow the connector to move along the length the channel. Alternatively if the T projection is rotated through approximately 90 degrees it can engage with overhangs formed above the edges of such a channel and with the sides of the channel to lock the connector in place. This and similar forms of friction lock assemblies can allow the connectors to be connected to and disconnected from a support framework quickly and without need of additional tools.

In some embodiments where a friction lock assembly is provided with the connector, this assembly may be detachable from the main body of the connector. For example in some instances the friction lock assembly may be engaged with the main body of the connector with the use of one or more screws, allowing different assemblies to be attached and detached depending on the form or dimensions of the channel being used.

Reference throughout this specification will also be made to a support framework being composed of a series of connected extruded aluminium beams substantially as described above. However those skilled in the art will also appreciate that other configurations of support frame are also envisioned for use within the present invention. Furthermore materials other than aluminium extrusions may also be used to form a support frame, such as for example, wooden or steel materials. Reference to the above throughout this specification should in no way be seen as limiting.

In preferred embodiments a support panel may be connected to a framework through the application of a plurality of male connectors to the interior side of the panel. In such embodiments these male connectors will cooperate with a plurality of female connectors applied to the framework in a complimentary arrangement or pattern to that used to distribute the male connectors. The panel can then be connected to the framework by the interior side of the panel being moved towards the framework to engage the male connectors with their opposed female connector.

Reference in general throughout this specification will also be made to male connectors being applied to the interior side of a panel and female connectors being applied to the support framework. However those skilled in the art appreciate that in an alternative embodiment male connectors may be applied to the framework, and female connectors may be applied to the surface panel.

A male connector provided in accordance with the present invention defines an engagement projection which extends from a locking surface. This engagement projection may extend in a direction or orientation substantially perpendicular to the locking surface defined by the male connector. This direction therefore defines the longitudinal axis of the engagement projection.

In a preferred embodiment an engagement projection may include at least one variation in its width or diameter along its longitudinal length. For example, in a further preferred embodiment the tip or end of the male connector furthest from the locking surface may have a width or diameter greater than that of the remainder of the projection. This variation or variations increase or reduce the resulting girth of the sides of the projection, allowing the male connector to cooperate and engage with complimentary features of the female connector.

A female connector provided in accordance with the present invention defines a receiving cavity with a complimentary form to the engagement projection of the male connector. This complimentary form allows the engagement projection inserted into the receiving cavity to contact an interior wall or walls of this cavity and engage the two connectors together.

In various preferred embodiments the interior walls of the receiving cavity may exhibit a non-linear variable profile which can—for example—extend a portion of the wall into the volume defined by the cavity, or form a recess which increases the volume of this cavity. This form of interior wall profile variation can cooperate with variations in the width or diameter of the male connector's engagement projection to engage these two connectors together.

Reference throughout this specification also be made to the walls of the receiving cavity been complimentary to and connecting with the male connector's engagement projection. Those skilled in the art will appreciate that the contacting surfaces of these components may be provided by a single continuous surface on either the receiving cavity or male connector, or a number of separate distinct surfaces if required. References made to a wall or walls of a receiving cavity (for example) should not be seen as limiting.

In some embodiments a single surface only of the receiving cavity may come into contact with limited portions only of the surface of an engagement projection. In such embodiments these contacting regions, surface or surfaces of the receiving cavity may be used to define the first positioning zone and second locking zone.

The receiving cavity defines a first positioning zone which is arranged to secure the engagement projection while also holding the male connector's locking surface out of engagement with the female connector. A locking surface may be operable to engage when brought into contact with a cooperating engagement surface. When a portion of the engagement projection is secured in the first positioning zone the opposite end of the male connector will therefore be held offset from the main body of the female connector, with the weight of a surface panel being supported by the framework. This offsetting of the locking surface of the male connector from the body of the female connector will allow a degree of movement in the relative positioning of the panel and the frame, allowing for final corrections of the alignment of the panel.

The interior walls of the receiving cavity also define a second locking zone which is arranged to secure the same portion of the engagement projection while also engaging the locking surface of the male connector with the female connector. When this portion of the engagement projection is secured in the second locking zone the engagement projection has preferably travelled as far as possible into the interior of the receiving cavity. In this arrangement the weight of the surface panel will again be supported by the framework, while the engagement of the male connector's locking surface with the female connector will securely and firmly lock the panel in position on the support framework.

Reference in general throughout this specification will be made to the end of a receiving cavity being located within the first positioning zone and second locking zone respectively of the female connector. However those skilled in the art should appreciate that in other embodiments different portions of the engagement projection may be located within the first locking zone while holding the locking surface out of contact with the female connector. For example in one possible alternative embodiment, a region of the engagement projection adjacent to its end having a diameter less than the end of the projection may be located within the first locking zone to hold the locking surface out of contact with the female connector. Once this same portion of the engagement projection moves through to the locking zone the male connector's locking surface will be placed in contact with the female connector.

In a preferred embodiment the interior walls of the receiving cavity may be formed by an insert located within a cavity defined in the main body of the female connector. The insert may be a sleeve. The interior walls of the receiving cavity defined by the sleeve can be used to position and subsequently lock onto an engagement projection, while the sleeve itself is formed with smaller dimensions than the cavity in the body of the female connector which receives the sleeve. The difference in dimensions between the exterior of the sleeve and its receiving cavity therefore allows a limited degree of movement or adjustment of a connected panel. This freedom of movement allows for adjustments in the position of a panel when the engagement projection is located in the positioning zone, as the male connector's locking surface is held offset from the opposed face of the female connector.

In a further preferred embodiment where an insert sleeve is located within an cavity of the main body of the female connector, the interior wall or walls defined by the sleeve may come into contact with limited portions only of the surface of an engagement projection. In such embodiments the material used to form the sleeve may function a similar manner to a resilient spring-loaded clip. For example, in some embodiments the introduction of an engagement projection into contact with the interior wall of the receiving cavity may develop a biasing force which urges the contacting portions of the interior walls against the surface of the engagement projection.

In a preferred embodiment the female connector may define at least one flexible resilient gripping surface which at least partially surrounds this connector's receiving cavity. In such embodiments a flexible resilient gripping surface can engage with the locking surface of the male connector when the end of the male connector's engagement projection is secured in the locking zone of the receiving cavity.

Those skilled in the art will appreciate that such a gripping surface may in some embodiments extend along the entire perimeter of the receiving cavity, whereas in other embodiments a gripping surface or surfaces may be deployed to partially surround or demarcate the perimeter of the receiving cavity entrance.

Reference in general throughout this specification will also be made to a resilient gripping surface being provided by a rubber O-ring or equivalent resilient component which surrounds the entrance to the receiving cavity.

Again those skilled in the art should appreciate that alternative configurations of gripping surfaces may also be used in conjunction with the present invention.

In such embodiments the locking surface defined by the male connector may incorporate at least one protrusion which when forced into contact with a resilient gripping surface will deform the gripping surface around the protrusion. This deformation of a resilient gripping surface will impede movement of the male connector in a direction substantially perpendicular to the longitudinal axis of the engagement projection, thereby locking the position of a panel relative to the support framework.

In a further preferred embodiment the locking surface of a male connector may define a plurality of ridges extending from one side of the connector to its opposite side. Preferably these ridges may have a length which ensures that they are capable of contacting both sides of a single resilient gripping surface, or gripping surfaces positioned on opposite sides of the receiving cavity. In a further preferred embodiment these ridges may be arranged parallel to one another and spaced so as to allow a gripping surface to deform around portions of each ridge.

However, those skilled in the art will appreciate that the provision of a resilient gripping surface in combination with a female connector should not be seen as an essential arrangement of the invention. In alternative embodiments a male connector's locking surface may incorporate at least one flexible gripping surface positioned so as to contact the region surrounding the entrance of the receiving cavity when the engagement projection is located within the locking zone of the receiving cavity. In such embodiments the surface of the female connector surrounding the entrance to receiving cavity may define one or more protrusion over which the male connectors locking surface can be deformed in a similar manner to that of the embodiments discussed above.

BRIEF DESCRIPTION OF THE DRAWINGS

An example embodiment of the invention is now discussed with reference to the drawings in which:

FIG. 1 shows a front perspective view of a female connector provided in accordance with a preferred embodiment of the invention, FIG. 2a shows a front perspective view a male connector provided in accordance with the embodiment shown with respect to FIG. 1, FIG. 2b shows a rear perspective view a male connector provided in accordance with the embodiment shown with respect to FIGS. 1 and 2a, FIG. 3 shows a view of multiple female connectors provided in accordance with the embodiment of FIG. 1 which have been engaged with a support framework installed within the interior walls and ceiling of a structure, FIGS. 9a and 9b show side cross-section views of the female connector of FIGS. 8a-8c when engaged with a male connector.

BEST MODES FOR CARRYING OUT THE INVENTION

FIG. 1 shows a front perspective view of a female connector 1 provided in accordance with a preferred embodiment of the invention.

The female connector 1 shown is formed by a main body 2 which defines an interior cavity 2b (shown in FIG. 3) with a housing entrance 2c.

Figure 5:
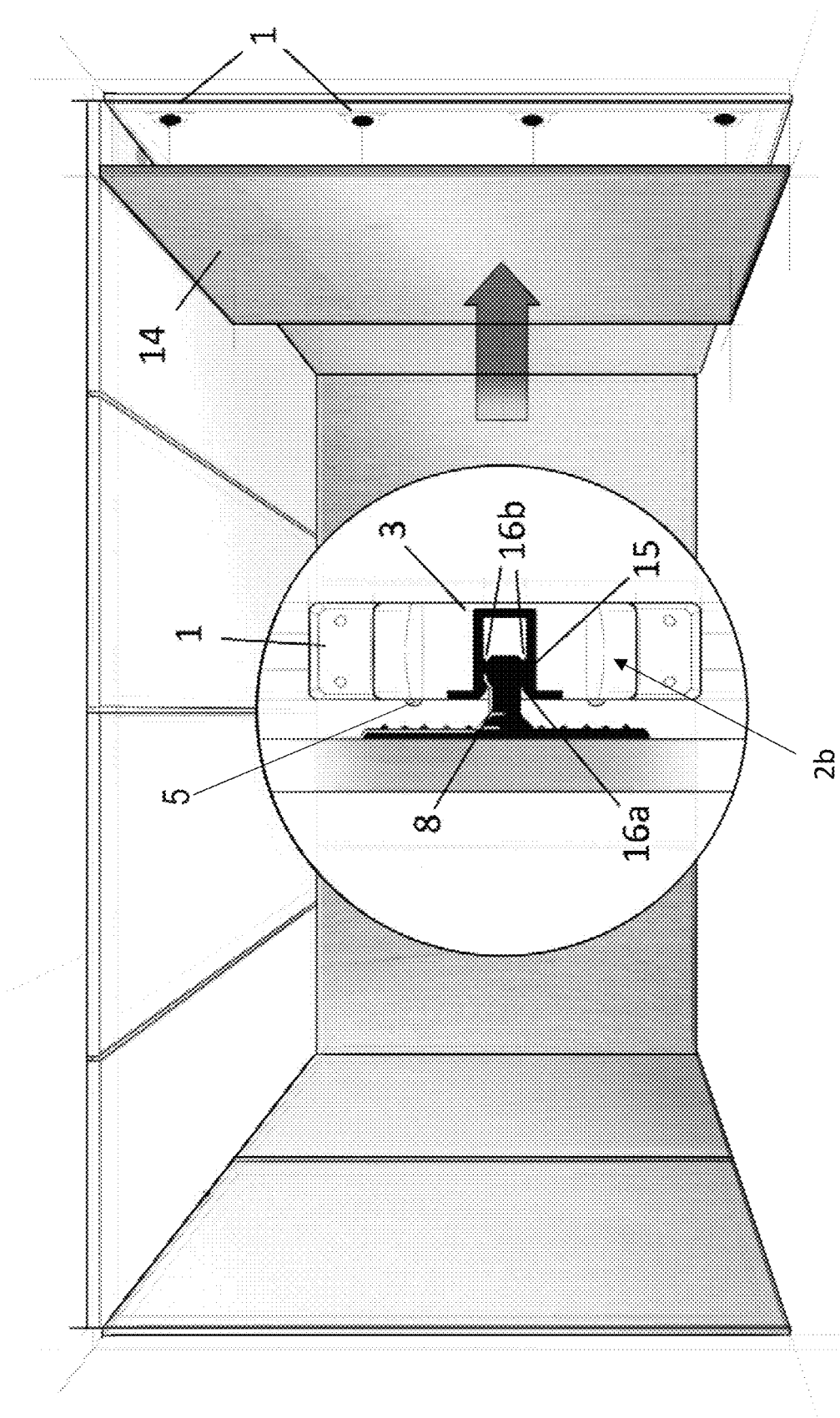
FIG. 5 illustrates the initial positioning of the panels used to form the wall of the structure as shown with respect to FIG. 3 using the male and female connectors of FIGS. 1 and 2a, 2b.
Figure 7:
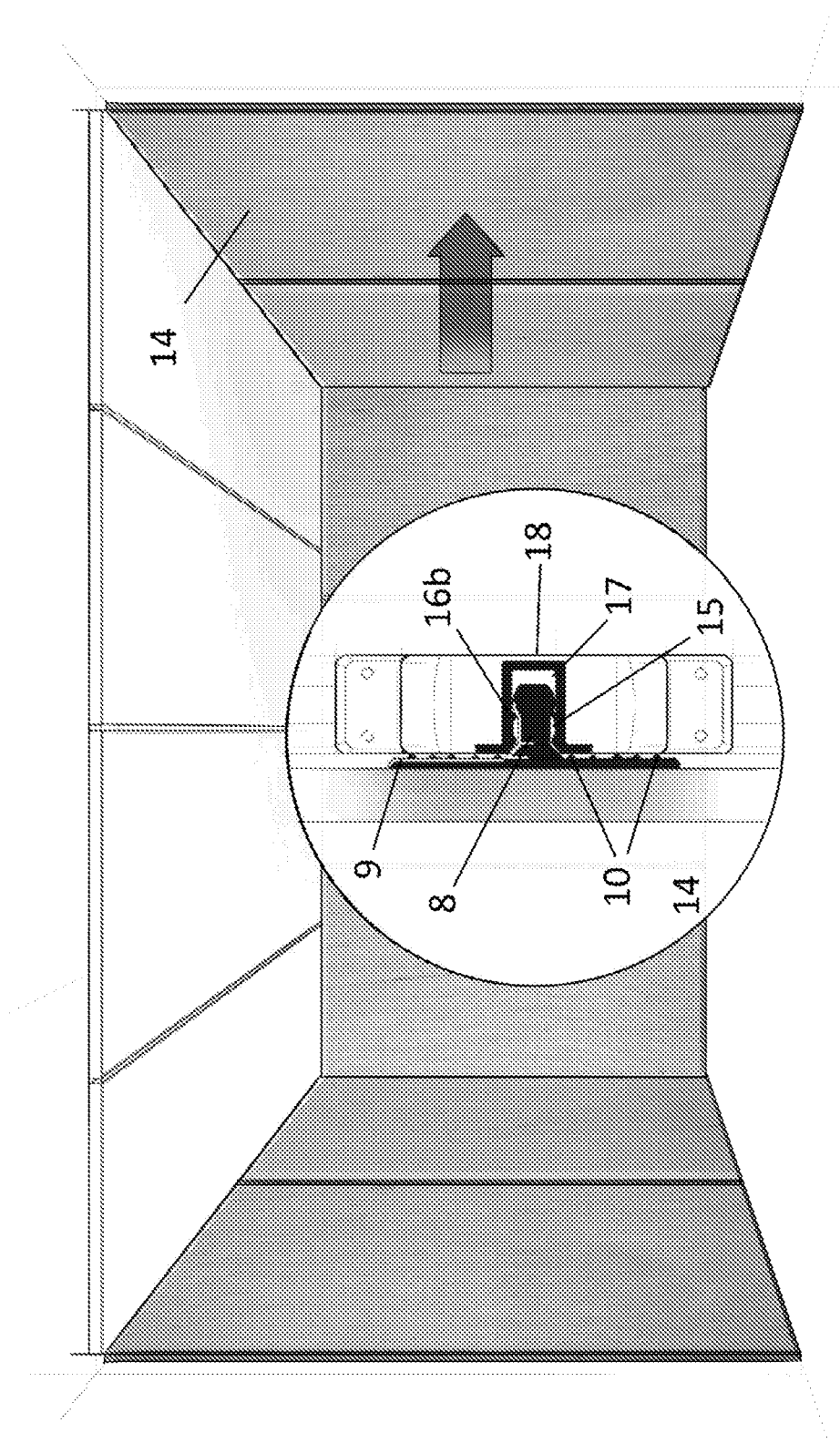
FIG. 7 illustrates the locking of each of the panels of FIGS. 5 and 6 to the support framework shown with respect to FIG. 3, and FIGS. 8a, 8b and 8c show a number of perspective views of a female connector provided in accordance with a further embodiment of the invention.

A receiving element in the form of sleeve 3 in this example is located within the cavity 2b, the sleeve having smaller dimensions than that of the cavity 2b. The enlarged insert cross-section views of the female connector provided by FIGS. 5 and 7 show this arrangement in more detail. These figures also illustrate features of the interior walls of a receiving cavity 4 defined by the sleeve 3.

The inner dimensions of the interior cavity 2b perpendicular, or transverse, to the receiving cavity are greater than outer dimensions of the sleeve 3 perpendicular to the receiving cavity to allow movement of the sleeve 3 in directions perpendicular within the housing 2. However, the dimensions of the inner cavity 2b parallel with the receiving cavity and the outer dimensions of the sleeve parallel with the receiving cavity prevent substantial movement of the sleeve parallel to the receiving cavity 4 and retain the sleeve 3 in the housing 2. In particular the housing aperture 2c is narrower than the width of the sleeve 3 to retain the sleeve in the housing. Therefore the sleeve 3 and receiving cavity 4 are supported against forces parallel to the receiving cavity while being able to move over an area in two dimensions under forces perpendicular to the receiving cavity 4.

In this example the housing entrance 2c has an area which corresponds to the area covered by the entrance 4b of the receiving cavity 4 as the sleeve 3 is moved over area of movement allowed by the inner dimensions of the cavity and outer dimensions of the sleeve. This allow the entrance of the receiving cavity to be exposed through the housing cavity 2c wherever the sleeve 4 is located in the area of movement allowed.

In this example the housing cavity 2 is cylindrical and the housing cavity entrance 2c is circular.

The perimeter of the entrance to the receiving cavity is surrounded by a gripping surface, formed in this embodiment by a flexible resilient rubber O-ring 5.

Figure 3:
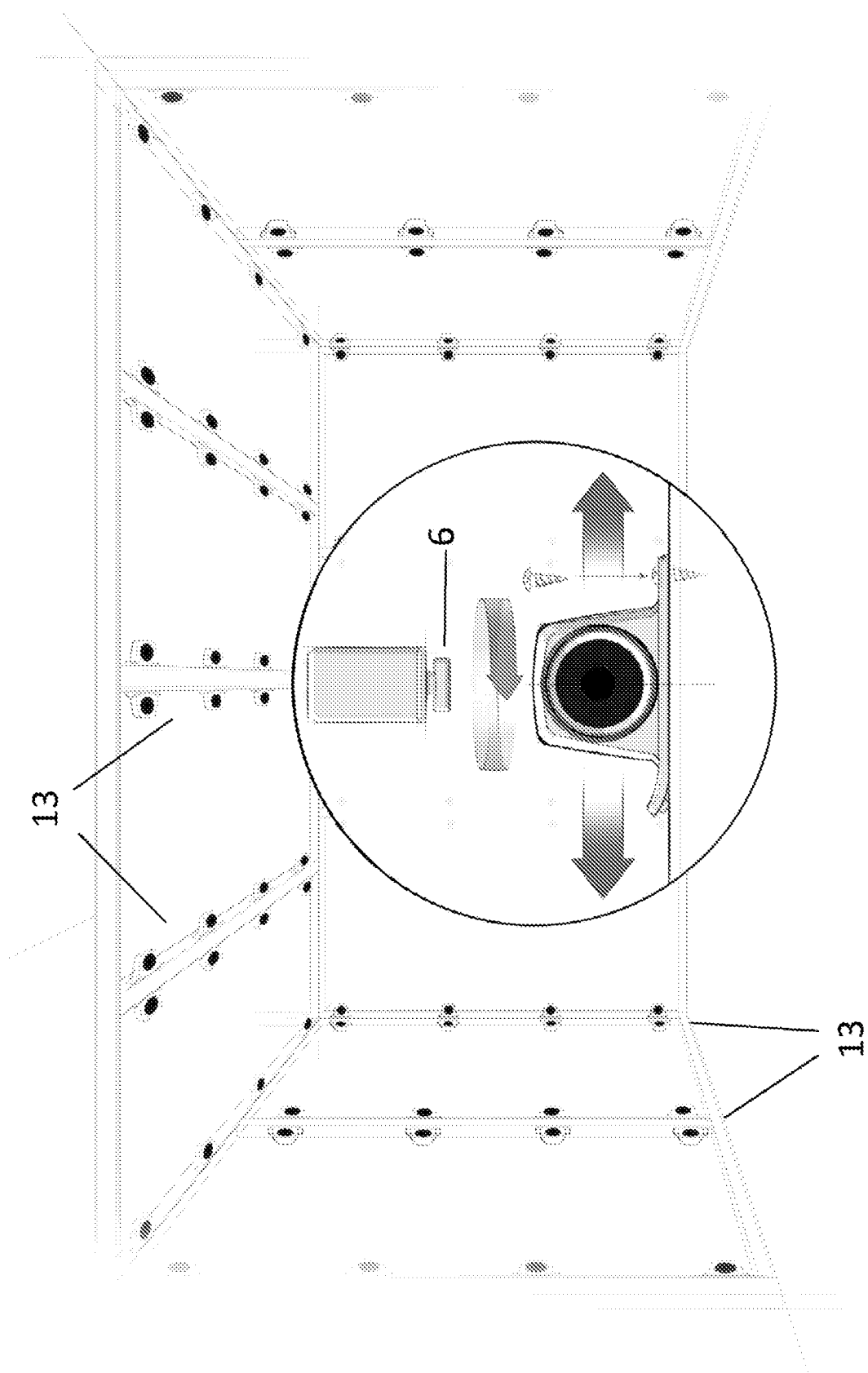

The female connector incorporates a friction lock assembly as shown with respect to FIG. 1 and the enlarged insert cross-section end view of the female connector provided by FIG. 3. In this embodiment the frictional assembly is provided by a centrally positioned T-shaped projection 6 extending from the surface of the female connector which is to engage with a channel formed in the support framework shown with respect to FIG. 3. FIG. 3 also illustrates how variations in the orientation of the female connector will engage and disengage the T-projection of the friction lock assembly.

FIG. 2a shows a front perspective view a male connector 7 provided in accordance with the embodiment shown with respect to FIG. 1. FIG. 2b shows a rear perspective view of the same male connector.

The male connector 7 defines an engagement projection 8 which extends from a locking surface 9. The o-ring 5 and locking surface 9 provide cooperating engagement surfaces which are able to engage each other to prevent movement of the male component relative to the housing 2 of the female component and perpendicular to the engagement projection.

The engagement projection 8 has a substantially perpendicular orientation to the plane of the locking surface 9. The locking surface includes a number of projecting ridges 10 which extend substantially across the width of the locking surface. A cooperating gripping surface on the female part 1 cooperates with the locking surface 8 when the locking surface 9 is brought into engagement with the female connector 1. In this example the gripping surface is provided by an O-ring 5 set into a surface of the housing 2 of the female connector 1 which extends substantially parallel to the locking surface 9 of a male connector 7 when projection 8 is received in the receiving cavity 4.

The ridges co-operate with the rubber O-ring 5 provided on the female connector to lock these two components engage to prevent movement in the plane of the locking surface when the locking surface 9 and female part are brought together, as shown in more detail with respect to FIG. 7. The locking surface 9 locks the position of the male connector 7 relative to the female connector 1 in the plane of the locking surface 8 when the locking surface 8 engages a gripping surface 5 of the female part. When the connector assembly is not locked by action of the locking surface 9 and o-ring 5 but the male connector 7 is secured to the female connector 1, the position of the male connector 7 is able to move with the cavity 4 over in two dimensions as allowed by the dimensions of the sleeve 3 and housing cavity 2b.

The engagement projection 8 defines a hollow central shaft 11 arranged to receive a screw 12 which penetrates through to the opposite side of the connector. This screw 12 is used to engage the male connector with the interior side of a surface panel.

Figure 4:
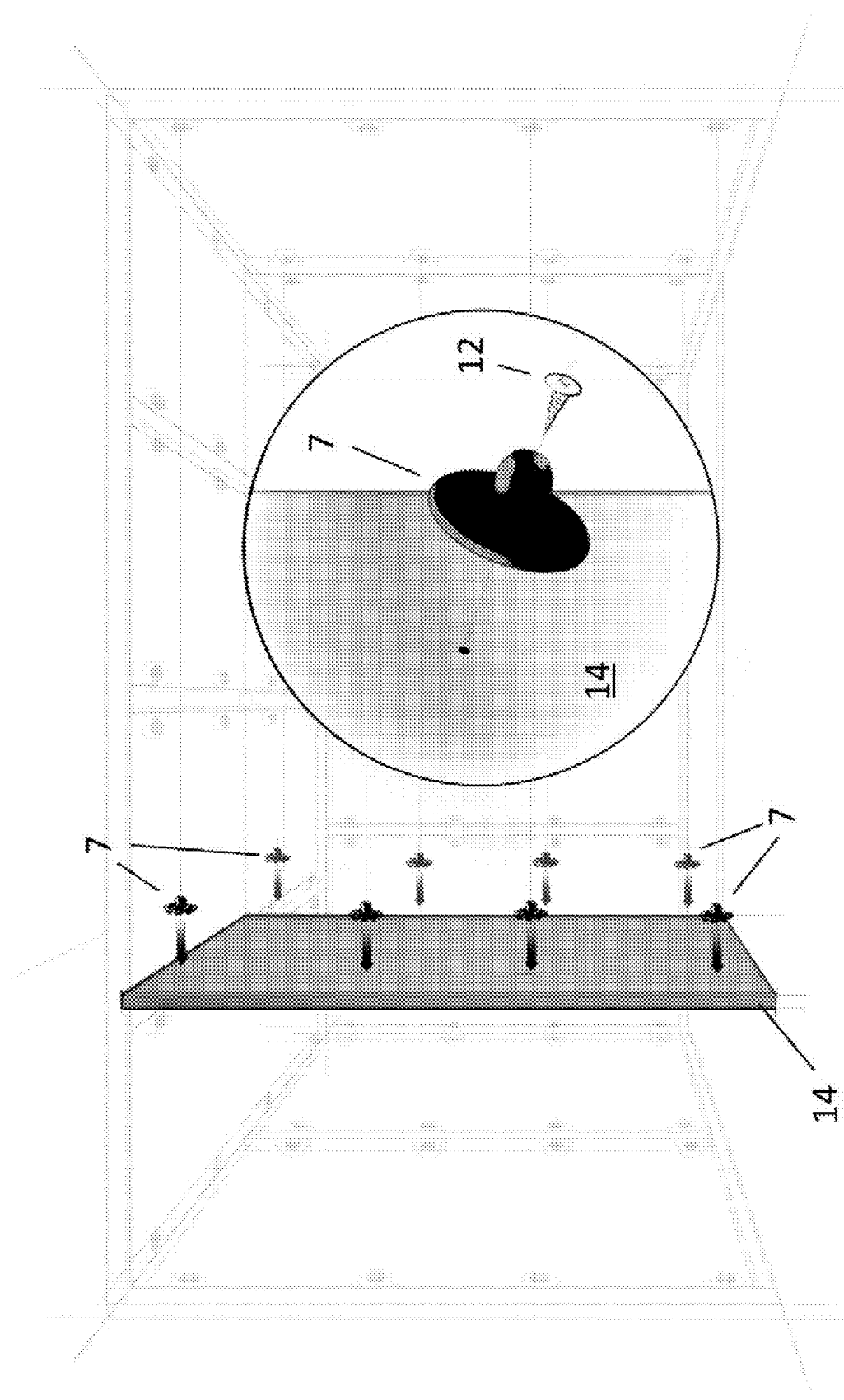
FIG. 4 illustrates the attachment of multiple male connectors provided in accordance the embodiment of FIGS. 2a, 2b to the interior side of surface panel.

FIG. 3 shows a view of multiple female connectors provided in accordance with the embodiment of FIG. 1 which have been engaged with a support framework 13 installed within the interior walls and ceiling of a structure. FIG. 4 also illustrates the attachment of multiple male connectors provided in accordance the embodiment of FIGS. 2a, 2b to the interior side of surface panel 14.

As can be seen from a comparison of FIGS. 3 and 4 the male and female connectors are matched in pairs and deployed in a complimentary pattern. The male connectors are screwed into the interior side of each panel 14, while the female connectors are slid along channels formed in the beams of the framework 13 and locked in place when they have a complimentary alignment.

FIG. 5 illustrates the operation of the receiving cavity 4 cooperating with the male projection 8.

The configuration of the connector assembly shown in FIG. 5 provides initial positioning of the panels used to form the walls of the structure as shown with respect to FIG. 3 using the male and female connectors of FIGS. 1 and 2a, 2b.

In this configuration the male projection 8 of the male connector 7 and the receiving cavity 4 are cooperatively engaged with the male projection held in a first, positioning zone 15. Specifically, the male projection 8 is received in the cavity 4 with a length of the projection 8 extending from the cavity 4 through the housing cavity 2b and extending away from the female connector to hold the locking surface 9 out of engagement with the O-ring 5 of the female connector. The cooperative engagement of the receiving cavity 4 and projection 8 secures the male connector 7 to the sleeve 3 which is retained in the housing 2 so the male connector 7 is secured to the female connector. In this configuration the sleeve 4 is able to move within the housing cavity 2 to allow the position secured male connector 7 to be adjusted within an area lying in the plane perpendicular to the receiving cavity 4 and projection 8.

Referring to the present stage of the panel installation process the interior side of the panel 14 is bought into close proximity with the framework 13 and the male and female connector pairs are aligned with one another. The ends 8a of the engagement projections 8 are inserted through the entrance of the female connector's receiving cavities. This action locates the ends of the engagement projections 8 within a first positioning zone 15 defined, in this example, by a pair of projections 16a, 16b formed in the interior walls of the receiving cavity. As can also be seen from FIGS. 2a, 2b and 5, the end of the engagement projection 8 has an increased diameter when compared to the rest of its length. This section is therefore easily trapped and contained within the first positioning zone 15.

Figure 6:
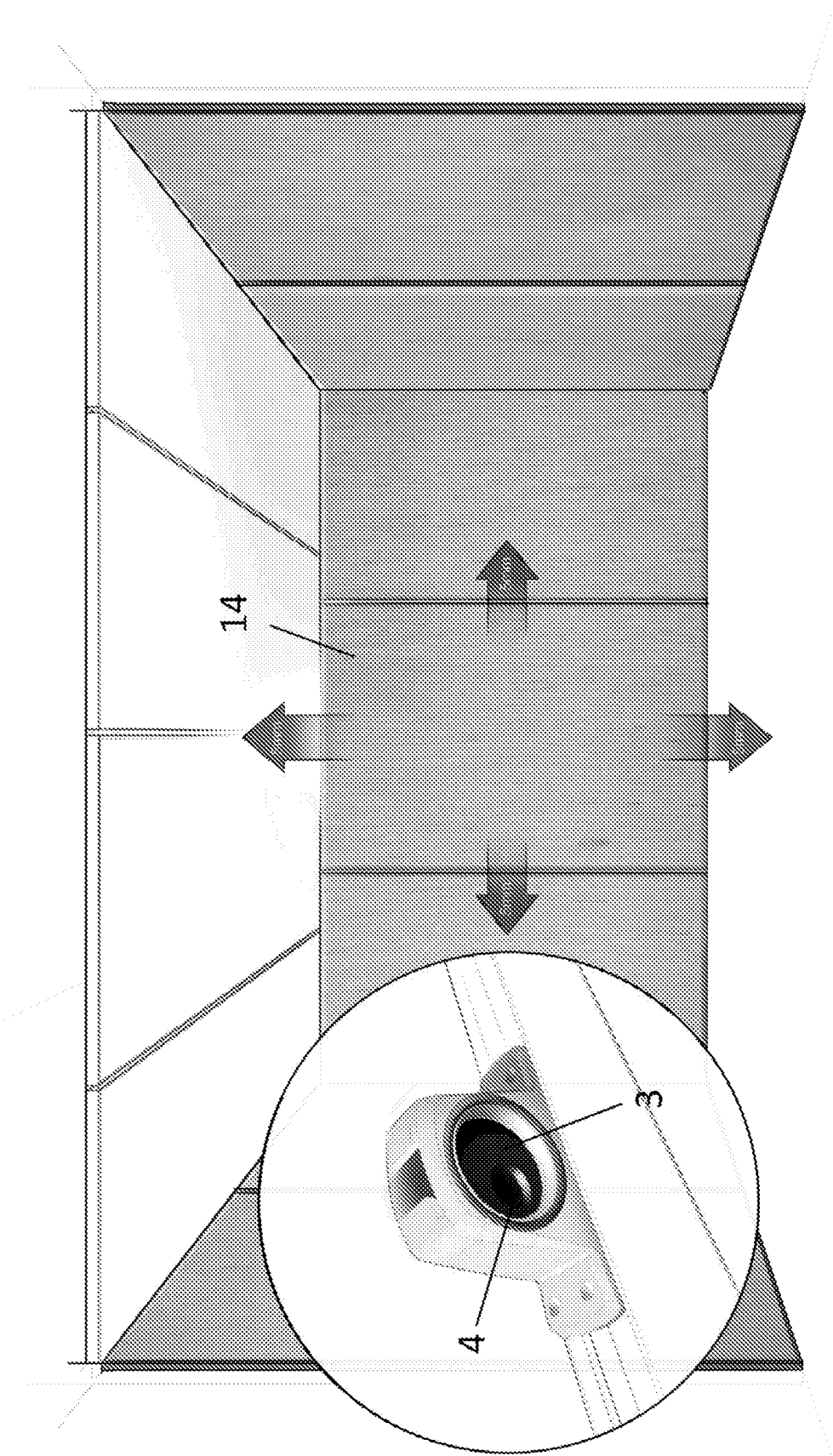
FIG. 6 illustrates the final position adjustment applied to each of the panels of FIG. 5.

In this example the positioning zone 15 is defined by the receiving cavity and secures the end of the engagement projection 8 while holding the locking surface 9 out of contact with the O-ring 5 of the female connector 1. The sleeve 3 used to form the receiving cavity walls can also move small distances in directions parallel to the interior surface of the panel 14. FIG. 6 illustrates the final position adjustment applied to each of the panels 14 of FIG. 5, and how this characteristic of the sleeve allows small final adjustments to be made in the position of the panel. As can be seen from the enlarged insert provided with FIG. 6, the sleeve has been shifted from its original centralised position to one side of the aperture form to container in the body of the female connector.

FIG. 7 illustrates the locking of each of the panels of FIGS. 5 and 6 to the support framework shown with respect to FIG. 3. After the final adjustments shown with respect to FIG. 6 have been made the panel 14 can be urged further inwards towards the support frame 13 to drive the end of the engagement projection 8 into a second locking zone 17 of the receiving cavity 4. The second locking zone 17 is bounded at one end by the end wall 18 of the cavity and at the opposite end by one of the projections 16b also used to form the positioning zone.

When the end of the engagement projection extends into the locking zone 17 the male connector's locking surface 9 engages with the rubber O-ring 5 of the female connector. The rubber O-ring deforms around and grabs onto the projecting ridges 10 formed in the locking surface to prevent any further motion of the panel 14 in directions parallel to the surface of the panel.

Figure 8C:
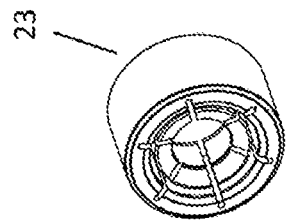
Figure 8B:
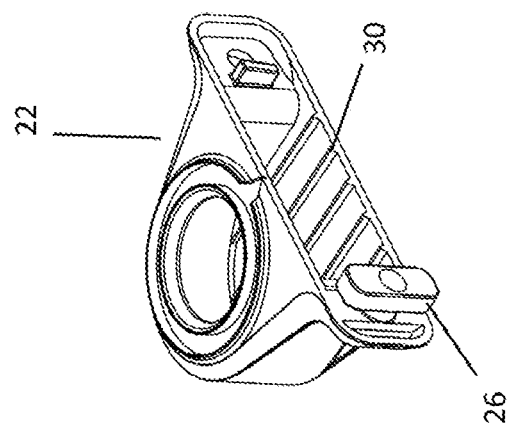
Figure 8A:
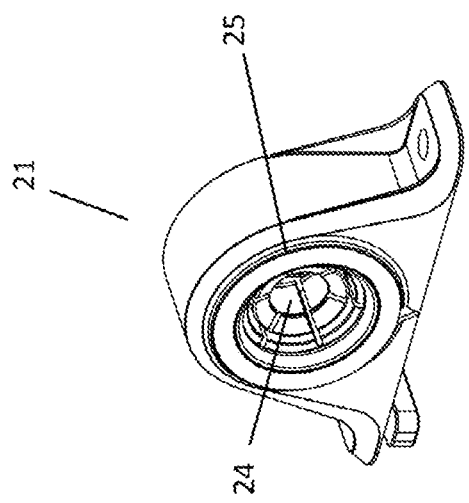

FIGS. 8a, 8b and 8c show a number of perspective views of a female connector 21 provided in accordance with a further embodiment of the invention. FIGS. 9a and 9b show two side cross-section views of this female connector when engaged with a male connector 27. In the view shown by FIG. 9a a portion of the engagement projection of the male connector is located within the female connector's positioning zone, while in FIG. 9b this component is located in the female connector's locking zone. Again, the female connector shown has a main body 22 defining an interior cavity 24 which receives a sleeve 23. FIG. 8a shows the main body with the sleeve in place, while FIG. 8b shows the sleeve removed, and FIG. 8c shows the sleeve in isolation. As can also be seen from FIG. 8b this interior cavity incorporates a number of ribs 30 which extend towards the sleeve when located within the interior cavity 24. These ribs locate the sleeve while still allowing a degree of movement relative to the main body of the female connector.

The female connector also incorporates a friction lock assembly similar to that illustrated with respect to the embodiment of FIGS. 1-7. However in the embodiment shown with respect to FIGS. 8 and 9 the "T" projection 26 used to form this component is deployed at one end of the main body of the female connector.

FIG. 9a shows the initial positioning phase of a panel installation process when the female connector of FIG. 8a is used with a complimentary male connector. Again the male and female connector pairs are aligned with one another and the end of the male's engagement projection 28 is inserted through the entrance of the female connector's receiving cavity. This action moves the end of the engagement projection through a positioning zone 31 and into a locking zone 32 defined by the sleeve 23 used to form the female connector's receiving cavity. The portion 33 of the shaft of the engagement projection adjacent to its end which has a restricted girth is captured in the positioning zone 31 by contact with the projecting portions 34 of interior wall of the receiving cavity. A second region 35 of the engagement projection with an increased diameter blocks further motion of the engagement projection 28 into the receiving cavity.

As can be seen from both FIGS. 9a and 9b the sleeve 23 used to form the receiving cavity walls can act as a resilient spring-loaded clip. The entry of the engagement projection 28 into the receiving cavity forces the contacting surface of the interior walls 34 away from the projection, generating a biasing force which urges the same surface into contact with the engagement projection.

FIG. 9b shows the subsequent locking together of the male and female connectors after an associated panel has been correctly positioned. Once this panel is to be located in place the male connector 27 is pushed towards the female connector 21 to drive the second increased diameter region 35 of the engagement projection into the female connector's locking zone 32. As with the embodiment shown with respect to FIGS. 1 through 7, in this configuration a locking surface 29 provided by the male connector engages with a rubber O-ring 25 deployed on the female connector to resist further lateral movement of the connected panel.

In the example described above the housing cavity 2 is cylindrical and the housing cavity entrance 2c is circular and the sleeve is cylindrical and a circular area is defined for range of movement for the receiving cavity 4. In alternative example embodiments the housing cavity, cavity entrance and sleeve provide any area of movement of the receiving cavity 4 apparent to the reader as suited to given applications. The area of various example embodiments may have any suitable shape or dimensions as apparent to the reader. Various shapes of example embodiments may include squares, rectangles, ellipses, ovals, triangles or other geometric shapes.

In additional example embodiments the housing entrance 2c may define an area that outside the range of movement allowed for the receiving cavity entrance 4b, for example to allow space for a guide recess suitable to guide an end of a projection of a male part 7 to the receiving cavity entrance 4b.

In various additional embodiments the sleeve may be biased towards a central position within the housing cavity to facilitate the projection of the male connector being received by the receiving cavity of the sleeve. In some embodiments the sleeve may have biasing elements. In other embodiments the female connector may have a biasing element provided. In alternative embodiments the sleeve may have surface features which cause the head of the projection of the male connector to move the sleeve towards alignment with the projection.

In various alternative embodiments the locking surface is located on the female component and the gripping surface is located on the male connector.

In various alternative embodiments cooperating surfaces are located on the female connector and male connector to engage and lock when they are forced together. In one example cooperating surfaces have spikes, abrasive elements, complementary gripping elements or other elements known to the reader as suitable to engage to lock the connectors against movement over each other.

In an alternative embodiment the receiving cavity and gripping and/or locking surface is provided by a unitary component. In some embodiments the component defines the gripping and/or locking surface and the receiving cavity and a part connecting the surface and cavity.

Embodiments of the present invention provide a connection system with a projection on a first connector and a co-operating cavity on a second connector to provide push-through connection of the connectors in first and second configurations in which the projection extends to first and second depths respectively within the cavity, wherein one or more of the projection or cavity is movable in two dimensions perpendicular to a longitudinal axis of the projection when received in the cavity, wherein the first and second connectors have cooperating locking surfaces arranged to engage each other when the projection is received at the second depth to prevent said movement in two dimensions and wherein the cooperating locking surfaces do not engage each other so as to prevent said movement in two dimensions when the projection is received at the first depth in the receiving cavity.

In various additional embodiments the first engagement surface is a resilient gripping surface and the second engagement surface is one or more protrusions.

In various additional embodiments an engagement surface may comprise any surface on the main body of the female connector or any cooperating surface on the male connector where cooperating surfaces have features of shape, contour, resilience or friction known as suitable to the skilled person to engage for given applications.

Embodiments of the present invention may provide many potential advantages over the prior art.

The present invention may provide a connection system which allows a connector, such as a female connector, to be secured to a cooperating connector, such as a male connector, and subsequently adjusted in relative position and locked in position.

Embodiments of the present invention may provide a connection system which allows a relatively unskilled installer to engage a surface panel with a support framework quickly and using a limited number of tools.

In various preferred embodiments the invention may utilise extruded material frameworks where connectors are engaged with a channel formed in such extrusions. Connectors may be readily engaged in position along the length of such channels to position a surface panel as desired.

Embodiments of the invention may provide flexibility in the positioning of a panel once initially engaged with a support frame. Panels may be initially supported on a framework in a positioning configuration, which preferably allows the position of the panel to be adjusted in two dimensions parallel to the surface of the structure being formed. Once correctly positioned the invention then allows the panel to be locked in place, and can also allow panels to be readily detached from the support frame if desired.

In various additional embodiments resilience and/or shape of any or all of the receiving element, receiving cavity engagement projection provides a biasing force for the engagement surfaces of the female and male connectors toward each other to facilitate their engagement.

In additional embodiments a channel of a beam may be substitutes for a rail or other feature known to the skilled person as able to be engaged by a connector.

It is to be understood that the present invention is not limited to the embodiments described herein and further and additional embodiments within the spirit and scope of the invention will be apparent to the skilled reader from the examples illustrated with reference to the drawings. In particular, the invention may reside in any combination of features described herein, or may reside in alternative embodiments or combinations of these features with known equivalents to given features. Modifications and variations of the example embodiments of the invention discussed above will be apparent to those skilled in the art and may be made without departure of the scope of the invention.

I claim:

1. A panel mounting assembly, comprising:
    a support framework comprising a set of beams, wherein the support framework is configured to mount a panel, and wherein the support framework comprises a plurality of connection systems each including at least one male connector and at least one female connector,
    wherein the plurality of connection systems are configured to initially connect the panel to the support framework, such that the panel is supported on the framework in a positioning configuration in which a position of the panel is adjustable in two dimensions parallel to a surface of the framework, and wherein the plurality of connection systems is configured to lock the panel in position.

2. The panel mounting assembly of claim 1, wherein the panel mounting assembly allows panels to be detached from the support framework.

3. The panel mounting assembly of claim 1, wherein the plurality of connection systems are configured such that the panel is connectable to the support framework by moving the panel towards the framework to engage the at least one male connector of the each of the plurality of connection systems with the respective, opposed at least one female connector thereof.

4. The panel mounting assembly of claim 1, wherein at least one of the plurality of connection systems is configured to secure the at least one male connectors thereof to the at least one female connector thereof and permit adjustment of the panel in two dimensions parallel to the surface of the support framework and then lock the panel in position relative to the support framework.

5. The panel mounting assembly of claim 1, wherein the panel mounting assembly allows the panel to be initially supported on the support framework in the positioning configuration, which allows the position of the panel to be adjusted in two dimensions parallel to a surface of a structure being formed and allows the panel to be locked in place subsequently to being adjusted.

6. The panel mounting assembly of claim 1, wherein at least one of the plurality of connection systems includes cooperating surfaces located on the at least one female connector and the at least one male connector to engage and lock when they are forced together.

7. The panel mounting assembly of claim 1, wherein at least one of the plurality of connection systems includes an engagement projection and a complementary receiving cavity configured to allow a portion of the engagement projection to move from a positioning zone, in which the position of the panel may be adjusted, and into a locking zone in which the position of the panel is locked, wherein movement of the engagement projection from the positioning zone to the locking zone is caused by the at least one male connector being forced relatively towards the at least one female connector to force a portion of the at least one male connector past the positioning zone.

8. The panel mounting assembly of claim 1, wherein at least one of the plurality of connection systems comprises an engagement projection and complementary receiving cavity, and wherein the at least one of the connection systems is operable to allow a portion of the engagement projection to be pushed beyond a positioning zone to secure said portion in a locking zone to lock the panel in position.

\* \* \* \* \*